United States Patent
Jian

(10) Patent No.: US 11,498,720 B2
(45) Date of Patent: Nov. 15, 2022

(54) FOLDABLE CONTAINER

(71) Applicant: HOREN CORTP CO., LTD., Shanghai (CN)

(72) Inventor: Yuanli Jian, Shanghai (CN)

(73) Assignee: HOREN CORTP CO., LTD., Shanghai (CN)

( * ) Notice: Subject to any disclaimer, the term of this patent is extended or adjusted under 35 U.S.C. 154(b) by 24 days.

(21) Appl. No.: 17/266,965

(22) PCT Filed: Aug. 8, 2019

(86) PCT No.: PCT/CN2019/099794
§ 371 (c)(1),
(2) Date: Feb. 8, 2021

(87) PCT Pub. No.: WO2020/030045
PCT Pub. Date: Feb. 13, 2020

(65) Prior Publication Data
US 2021/0309413 A1 Oct. 7, 2021

(30) Foreign Application Priority Data
Aug. 8, 2018 (CN) .......................... 201810894182.X

(51) Int. Cl.
*B65D 19/06* (2006.01)
(52) U.S. Cl.
CPC ........ *B65D 19/06* (2013.01); *B65D 2519/009* (2013.01); *B65D 2519/00601* (2013.01);
(Continued)
(58) Field of Classification Search
CPC ............ Y10S 220/907; B65D 11/1846; B65D 11/184; B65D 11/1833; B65D 11/1826;
(Continued)

(56) References Cited

U.S. PATENT DOCUMENTS 4,300,695 A * 11/1981 Hsu ..................... B65D 11/1833
    220/6
4,781,300 A * 11/1988 Long ..................... D06F 95/002
    220/6
(Continued)

FOREIGN PATENT DOCUMENTS

| AU | 3129500 A | 3/2001 |
| CN | 2863658 Y | 1/2007 |

(Continued)

OTHER PUBLICATIONS

International Search Report (with English translation) and Written Opinion issued in PCT/CN2019/099794, dated Oct. 31, 2019.
(Continued)

*Primary Examiner* — Kareen K Thomas
(74) *Attorney, Agent, or Firm* — Hamre, Schumann, Mueller & Larson, P.C.

(57) ABSTRACT

This application discloses a foldable container. The foldable container has a base and two pairs of opposite side plates. The side plates are hinged to the base. Adjacent side plates are capable of being engaged with each other through engaging structures and being locked with each other through locking mechanisms to form a container body. At least one of the side plates is arranged such that when being unlocked from an adjacent side plate, it can be rotated towards the inner side of the container body and can be also rotated towards the outer side of the container body relative to the base. At least one side plate of the foldable container in this application can be rotated towards the inner side of the container body and can be rotated towards the outer side of the container body, and can be removed after being rotated, thereby greatly facilitate accessing goods, especially bulky and heavy goods.

17 Claims, 9 Drawing Sheets

(52) U.S. Cl.
CPC ............... *B65D 2519/00611* (2013.01); *B65D 2519/00805* (2013.01)

(58) Field of Classification Search
CPC .............. B65D 11/182; B65D 11/1813; B65D 11/1806; B65D 11/18; B65D 19/06; B65D 2519/00601; B65D 2519/00611; B65D 2519/00805; B65D 2519/009; B65D 25/005; B65D 2519/00034; B65D 2519/00069; B65D 2519/00174; B65D 2519/00333; B65D 2519/00587; B65D 2519/00646; B65D 19/18; B65D 11/1873
See application file for complete search history.

(56) References Cited

U.S. PATENT DOCUMENTS

| | | | | |
|---|---|---|---|---|
| D306,264 | S * | 2/1990 | Malmanger | D3/294 |
| 5,094,356 | A * | 3/1992 | Miller | B65D 11/1833 206/509 |
| 5,161,709 | A * | 11/1992 | Oestreich, Jr. | B65D 25/005 220/4.28 |
| 5,515,987 | A * | 5/1996 | Jacques | B65D 11/1833 220/6 |
| 5,746,342 | A * | 5/1998 | Jacques | B65D 1/246 220/6 |
| 5,865,334 | A * | 2/1999 | Ruiz | B65D 85/48 206/451 |
| 6,015,056 | A * | 1/2000 | Overholt | A45C 7/0036 220/6 |
| 6,398,054 | B1 * | 6/2002 | Overholt | B65D 11/1833 220/6 |
| 6,446,825 | B1 * | 9/2002 | Godoy | B65D 11/1833 220/6 |
| 7,063,223 | B2 * | 6/2006 | Iwahara | B65D 11/1833 220/6 |
| 7,374,056 | B2 * | 5/2008 | Linares | B65D 90/00 220/1.5 |
| 9,033,183 | B2 * | 5/2015 | Hug | B65D 19/18 220/4.28 |
| 9,227,754 | B2 * | 1/2016 | Liu | B65D 11/1833 |
| 2002/0108950 | A1 * | 8/2002 | Moorman | B65D 11/1833 220/7 |
| 2002/0108951 | A1 * | 8/2002 | Zelko | B65D 11/1833 220/7 |
| 2003/0136781 | A1 * | 7/2003 | Rumpel | B65D 21/0201 220/6 |
| 2004/0159659 | A1 * | 8/2004 | Rumpel | B65D 21/0224 220/7 |
| 2004/0256385 | A1 * | 12/2004 | Hartwall | B65D 19/18 220/6 |
| 2007/0017916 | A1 * | 1/2007 | Sabanci | B65D 11/1833 220/7 |
| 2008/0169285 | A1 * | 7/2008 | Marazita | B65D 19/18 220/6 |
| 2010/0320202 | A1 | 12/2010 | Yamauchi | |

FOREIGN PATENT DOCUMENTS

| | | | |
|---|---|---|---|
| CN | 201284040 Y | 8/2009 | |
| CN | 202115784 U | 1/2012 | |
| CN | 102935908 A | 2/2013 | |
| CN | 103043332 A * | 4/2013 | ............ B65D 19/18 |
| CN | 108860921 A | 11/2018 | |
| DE | 202013103848 U1 | 10/2013 | |
| DE | 202016106088 U1 | 2/2017 | |
| DE | 202016106088 U1 * | 3/2017 | ......... B65D 11/1833 |
| JP | 05-040129 U | 5/1993 | |
| JP | 2003-518471 A | 6/2003 | |
| JP | 2006-051966 A | 2/2006 | |
| WO | 2003024815 A1 | 3/2003 | |
| WO | WO-03024815 A1 * | 3/2003 | ......... B65D 11/1833 |
| WO | 2014111046 A1 | 7/2014 | |
| WO | WO-2014111046 A1 * | 7/2014 | ............ B65D 19/18 |

OTHER PUBLICATIONS

Australian Examination Report issued in corresponding Australian Patent Application No. 2019319476, dated Mar. 18, 2022, 4 pages.
Extended European Search Report issued in corresponding European Patent Application No. 19847179.9, dated Mar. 7, 2022, 8 pages.
Japanese Notice of Reasons for Refusal issued in corresponding Japanese Patent Application No. 2021-506519, dated Mar. 8, 2022, English translation provided, 6 pages.

* cited by examiner

FOLDABLE CONTAINER

CROSS REFERENCE TO RELATED APPLICATIONS

This application claims the priority of the Chinese application No. 201810894182.X, titled "Foldable Container" filed on Aug. 8, 2018, which is incorporated by reference herein in its entirety.

TECHNICAL FIELD

The invention relates to a logistics transportation device, in particular to a container.

TECHNICAL BACKGROUND

The core characteristic of foldable containers, especially plastic foldable containers, is that they can be folded and stored when being not in use, which greatly reduces the storage space of empty containers and improves the cost-effectiveness of return transportation. Therefore, they are gradually replacing the existing integrated boxes and ton barrels on the market. These boxes are generally composed of a base and two pairs of opposite side plates. The side plates can be designed with small doors that can be opened outward to facilitate users to obtain goods from the container or place goods into the container.

The height of these small doors is generally no more than half of the height of the side plates. The height of the small doors of immediate bulk containers (the height of conventional IBC is between 500 and 1300 mm) is usually designed to be no more than 400 mm which can meet the demand of loading and unloading. For some larger and heavier goods, the size of the small door can no longer provide convenience in loading and unloading.

The side plates of the existing foldable container are all folded after being rotated inwards. The advantage is that when the container is unfolded, it has better resistance to the impact of the internal cargo on the side plates, while the ability to resist external impact is slightly weaker, and the side plates cannot be removed or folded when loading and unloading goods. Therefore, there is a need for a box that can facilitate loading and unloading of large and heavy goods on the market.

SUMMARY

This invention aims to provide a foldable container, wherein at least one side plate thereof can be rotated towards the inner side of the container body and can be rotated towards to the outer side of the container body.

In order to achieve the above aim, this invention provides a foldable container, comprising a base and two pairs of opposite side plates hinged to the base, wherein adjacent side plates are capable of engaging with each other through engaging structures and being locked with each other through locking mechanisms to form a container body, wherein at least one side plate is configured such that after being unlocked from adjacent side plate, the at least one side plate is rotatable towards the inner side of the container body, and is also rotatable towards the outer side of the container body relative to the base.

In one embodiment, the engaging structures comprise a first engaging structure provided on one side plate and a second engaging structure provided on adjacent side plate, wherein the first engaging structure and the second engaging structure are configured to be engaged with each other, and the first engaging structure is movable towards the inner side of the container body to be disengaged from the second engaging structure and is also movable towards the outer side of the container body to be disengaged from the second engaging structure.

In one embodiment, at least one side plate is provided with a hinging pin at the bottom thereof, and an edge of the base is provided with a hinging part, wherein the hinging pin is disposed in and is rotatable relative to the hinging part, and the hinging part is configured such that after the side plate provided with the hinging pin is disengaged from adjacent side plates, the side plate provided with the hinging pin is removable from the base.

In one embodiment, the hinging part comprises an opening part which opens upwards and hinging grooves provided at both sides of the opening part respectively.

In one embodiment, a pair of opposite side plates of the two pairs of opposite side plates are configured such that after being unlocked from the adjacent side plates, they are only rotatable towards the inner side of the container body relative to the base.

In one embodiment, a pair of opposite side plates of the two pairs of opposite side plates are configured such that after being unlocked from adjacent side plates, they are rotatable towards the inner side of the container body relative to the base, and are also rotatable towards the outer side of the container body relative to the base, and the other pair of opposite side plates are configured such that after being unlocked from adjacent side plates, they are only rotatable towards the inner side of the container body relative to the base.

In one embodiment, at least one of the two pairs of opposite side plates is configured to be detachable from the base after being unlocked from adjacent side plate, and the rest side plates of the two pairs of opposite side plates are configured to remain being connected to the base after being unlocked from the adjacent side plates.

In one embodiment, the locking mechanism comprises a handle provided on the top of one side plate, a linkage rod, a tongue, and a locking hole provided at an adjacent side plate, wherein the handle is connected to the linkage rod, and the linkage rod is associated with the tongue to drive the tongue to move, so that the tongue enters or exits the locking hole.

Preferably, the linkage rod is installed in the side plate.

Preferably, the tongue is installed in the side plate.

In one embodiment, the locking mechanism has a plurality of the tongues installed in the side plate at intervals, and the linkage rod is provided with a plurality of driving pins spaced apart, wherein each of the driving pins cooperates with a corresponding tongue to drive the tongue to move.

In one embodiment, the tongue is provided with a driving groove, the driving pin is placed in the driving groove, and the driving groove is shaped such that when the linkage rod moves up and down, the driving pin cooperates with the driving groove to drive the tongue to move telescopically.

In one embodiment, the handle is provided with a rotating shaft and a driving hole, the side plate is provided with a handle mounting hole, and the linkage rod is provided with a hanging pin, wherein the rotating shaft is rotatably installed in the handle installation hole, and the hanging pin is movably connected to the driving hole.

In one embodiment, the handle is further provided with a positioning protrusion, the side plate is provided with a handle positioning groove, and the positioning protrusion cooperates with the handle positioning groove, so that the handle is maintained at a specified angle.

In one embodiment, the handle is further provided with a hanging groove, and a hanging table is provided on the side plate adjacent to the side plate provided with the handle, wherein the hanging groove and the hanging table cooperates with each other, so that when the locking mechanism is in the locked state, the inner and outer walls of the hanging groove on the handle are fitted over the hanging table.

In one embodiment, a pair of opposite side plates is arranged such that when being unlocked from an adjacent side plate, it is rotatable towards inside of the container body relative to the base, and is also rotatable towards the outer side of the container body relatively to the base.

In one embodiment, at least one side plate is provided with a small door which can be opened and closed relative to the side plate.

This application also provides a foldable container, comprising a base and two pairs of opposite side plates hinged to the base, wherein adjacent side plates are capable of engaging with each other through engaging structures and being locked with each other through locking mechanisms to form a container body, wherein the engaging structures comprises a first engaging structure provided on one side plate and a second engaging structure provided on adjacent side plate, the first engaging structure and the second engaging structure are configured to be capable of engaging with each other, and the first engaging structure is movable towards the inner side of the container body to be disengaged from the second engaging structure and is also movable towards the outer side of the container body to be disengaged from the second engaging structure;

at least one side plate is provided with a hinging pin at the bottom thereof, and an edge of the base is provided with a hinging part, wherein the hinging pin is disposed in and is rotatable relative to the hinging part, and the hinging part is configured such that after the side plate provided with a hinging pin is disengaged from adjacent side plate, the side plate provided with the hinging pin is removable from the base; and the locking mechanism comprises a handle provided on the top of one side plate, a linkage rod and a tongue, and a locking hole provided in an adjacent side plate, wherein the handle is connected to the linkage rod, and the linkage rod is associated with the tongue to drive the tongue to move, so that the tongue enters or exits the locking hole.

In one embodiment, the locking mechanism has a plurality of the tongues installed in the side plate at intervals, and the linkage rod is provided with a plurality of driving pins spaced apart, each of the driving pins cooperates with a corresponding tongue to drive the tongue to move.

In one embodiment, the tongue is provided with a driving groove, the driving pin is placed in the driving groove, and the driving groove is shaped such that when the linkage rod moves up and down, the driving pin cooperates with the driving groove to drive the tongue to move telescopically.

In one embodiment, the handle is provided with a rotating shaft and a driving hole, the side plate is provided with a handle mounting hole, and the linkage rod is provided with a hanging pin, wherein the rotating shaft is rotatably installed in the handle installation hole, and the hanging pin is movably connected to the driving hole.

In one embodiment, the handle is further provided with a hanging groove, and a hanging table is provided on the side plate adjacent to the side plate provided with the handle, wherein the hanging groove and the hanging table cooperates with each other, so that when the locking mechanism is in a locked state, the inner and outer walls of the hanging groove on the handle are fitted over the hanging table.

At least one side plate of the foldable container in this application can be rotated both inwardly and outwardly relative to the container body, and can be removed after being rotated, thereby greatly facilitate accessing goods, especially bulky and heavy goods.

EMBODIMENTS

Figure 1:
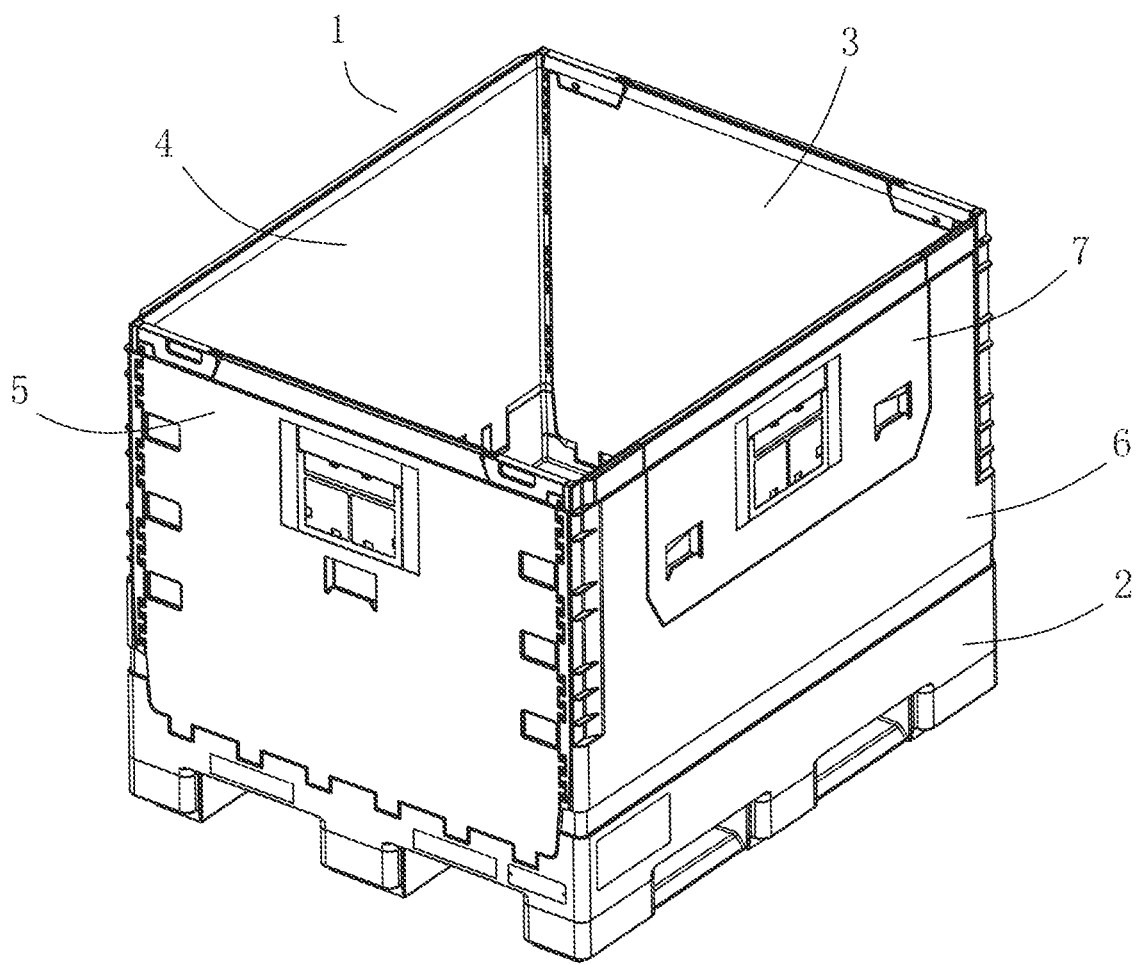
FIG. 1 is a perspective view of a foldable container according to one embodiment of the present invention.

The preferred embodiment of this invention will be described in detail with reference to the accompanying drawings, so that the purposes, the characteristics and the advantages of the invention can be more clearly understood. It should be understood that the embodiments shown in the figures are not intended to limit the scope of this invention, but illustrate the essential spirit of the technical solution of this invention.

In the following description, certain specific details are set forth for purposes of illustrating the various disclosed embodiments to provide a thorough understanding of the various disclosed embodiments. However, those skilled in this art will recognize that embodiments may be practiced without one or more of these specific details. In other instances, well-known devices, structures, and techniques associated with the present application may not be shown or described in detail to avoid unnecessarily obscuring the description of the embodiments.

Unless otherwise desired by context, throughout the specification and claims, the terms "comprising" and variations thereof, such as "containing" and "having", are to be construed as open-ended, i.e., to be construed as "comprising, but not limited to".

Throughout the specification "one embodiment" or "one embodiment" means that a particular feature, structure, or characteristic described in connection with the embodiment is included in at least one embodiment. Therefore, the presence of "in one embodiment" or "in one embodiment" at various locations throughout the specification need not all refer to the same embodiment. Additionally, particular features, structures, or features may be combined in any manner in one or more embodiments.

The singular forms "a" and "said" as used in the specification and appended claims include plural references unless the context clearly dictates otherwise.

The term "or" be used in its usual sense including "and/or" unless the context clearly dictates otherwise.

In the following description, for clarity of illustration of the structure and mode of operation of the present invention, various directional terms will be used to describe the present invention, but words such as "front", "rear", "left", "right", "outer", "inner", "outward", "inward", "upper", "lower", and the like, should be understood as convenient terms and should not be construed as limiting terms.

The foldable container herein is a relatively large foldable container, such as IBC, having a capacity generally more than 300 L. The foldable container generally has a base and two pairs of opposite side plates. The side plates are hinged to the base, so that adjacent side plates can be folded relative to the base. The adjacent side plates can be engaged with each other through the engaging structure. The adjacent side plates can be locked with each other through locking mechanisms to form a container body. In this application, at least one of the side plates is configured such that after being unlocked from an adjacent side plate, it can be turned both towards the inner side of the container body and towards the outer side of the container body relative to the base. Preferably, after the side plate is rotated and disengaged from adjacent side plates, the side plate can be removed from the base. Preferably, a pair of the two pairs of opposite side plates can be rotated both towards the inner side of the container body and towards the outer side of the container body relative to the base.

Figure 2:
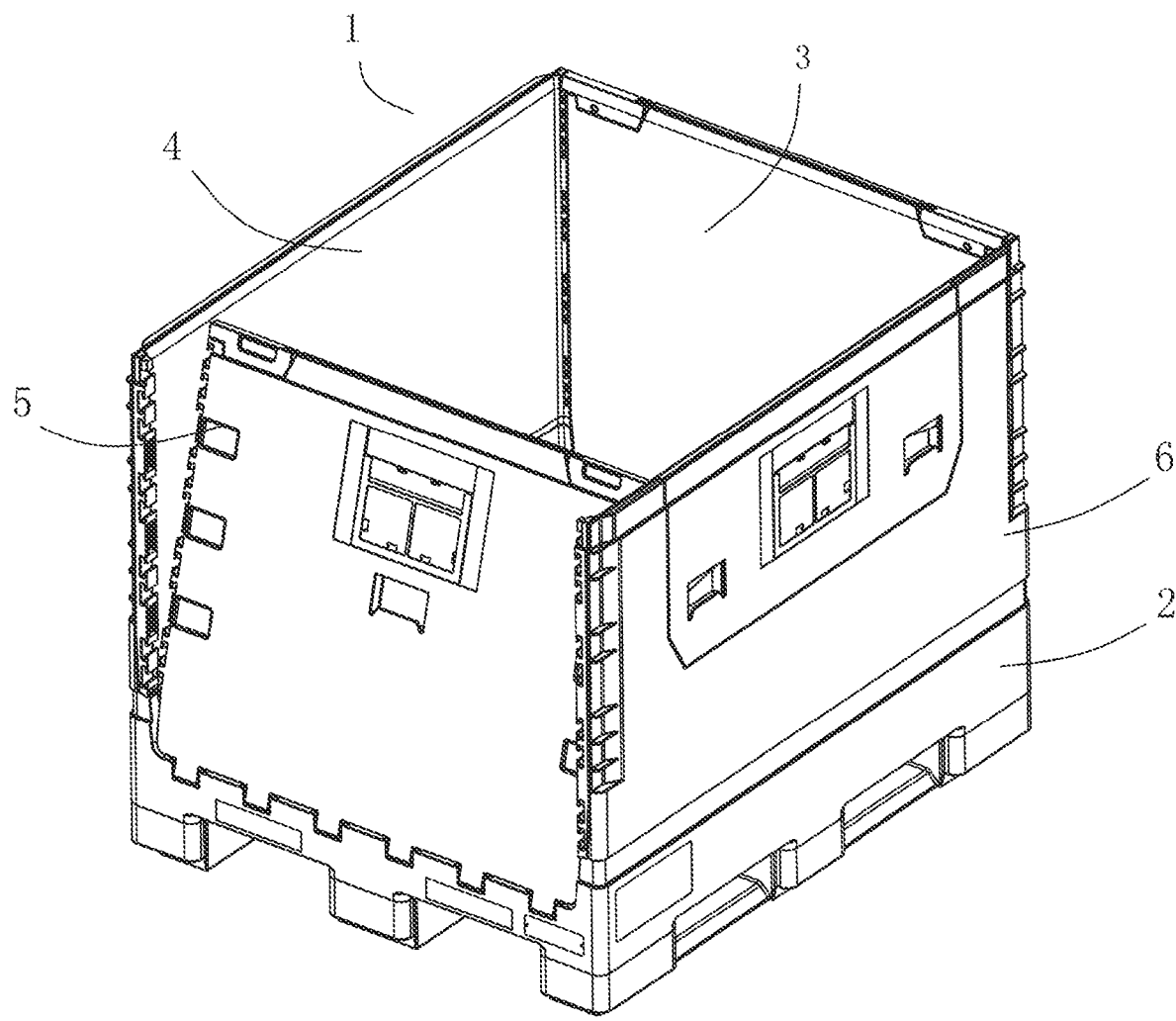
FIG. 2 is another perspective view of a foldable container with one of the side plates turned inwardly of the container body.

As shown in FIGS. 1-2, a foldable container 1 comprises a base 2, a pair of opposite side plates 3 and 5, and another pair of opposite side plates 4 and 6. Each of the side plates is hinged to the base 2 such that the side plates are foldable relative to the base. The side plates 3 and 5 are shorter than the side plates 4 and 6, so that the side plates 3 and 5 are also referred to as short side plates, and the side plates 4 and 6 are also referred to as long side plates. The side plate 6 are provided with a door 7 which can be opened or closed relative to the side plates 6, thereby facilitating user to access articles at the bottom of the container.

Adjacent side plates, such as the side plate 4 and the side plate 5, as well as the side plate 5 and the side plate 6, can be mutually engaged through an engaging structure. The engaging structure can limit the upward displacement of one side plate relative to the other side plate. The adjacent side plates 3, 4, 5 and 6 can be locked with each other through the locking mechanisms to form the container body.

Figure 3:
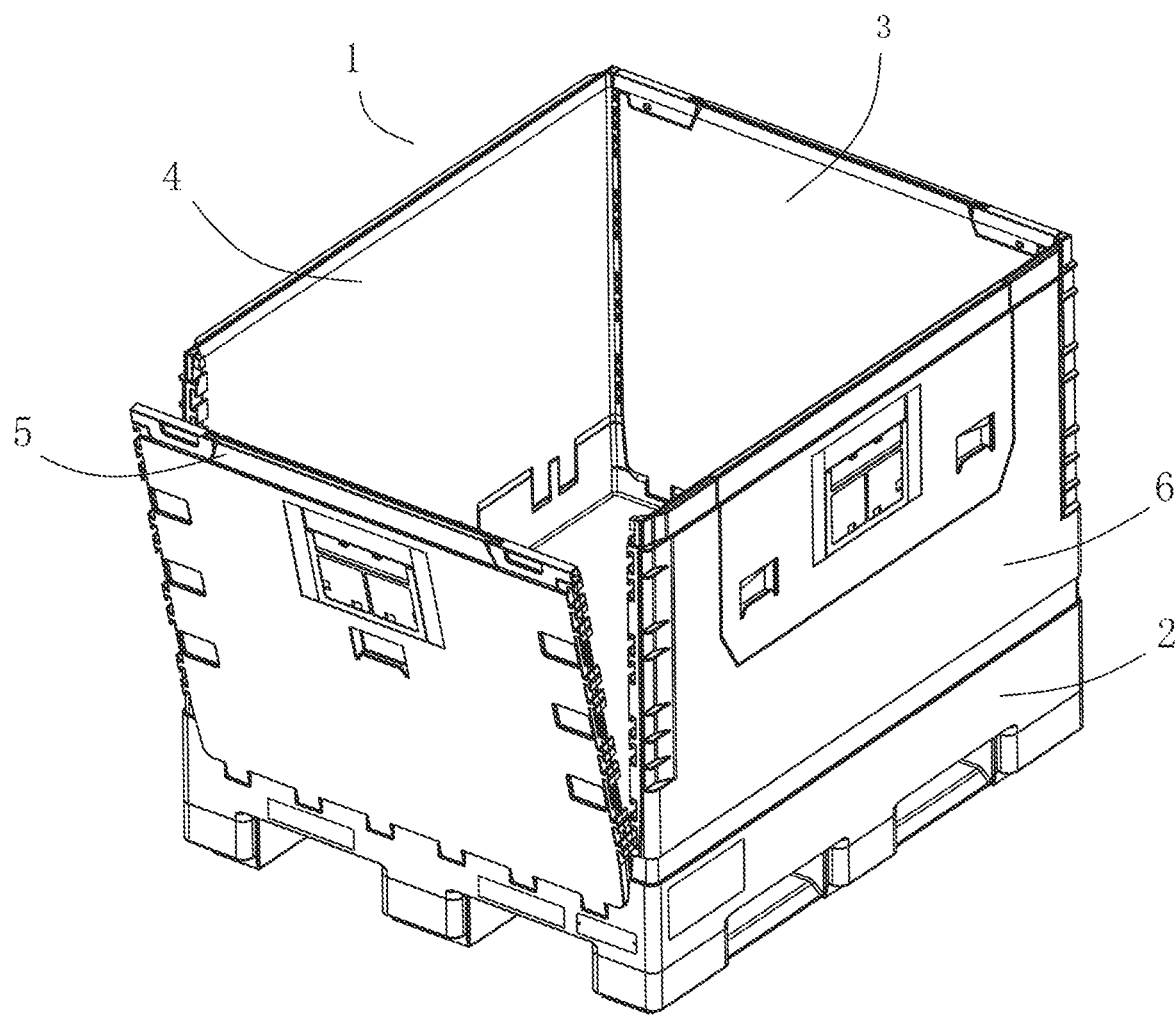
FIG. 3 is yet another perspective view of a foldable container with one of the side plates turned outwardly of the container body.

In this embodiment, after being unlocked from adjacent side plates, the side plates 3 and 5 can be rotated towards the inside of the container body relative to the base 2, as shown in FIG. 2, it can also be rotated outwards of the container body relative to the base, as will be shown in FIG. 3. It should be understood, alternatively, only the side plate 3 or the side plate 5 can be turned both towards the inner side of the container body and towards the outer side of the container body relative to the base 2. Alternatively, all of four side plates can be turned both towards the inner side of the container body and towards the outer side of the container body relative to the base 2. But preferably, only one side plate or a pair of opposite side plates can be rotated both towards the inner side of the container body and towards the outer side of the container body relative to the base 2, and the rest side plates can only be rotated towards the inner side of the container body relative to the base 2.

Figure 4:
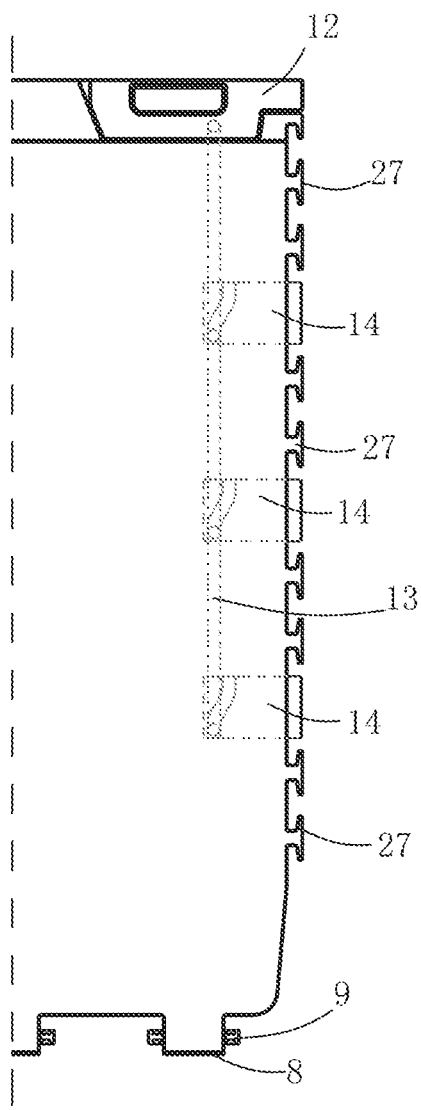
FIG. 4 is a perspective view of a portion of a side plate.
Figure 5:
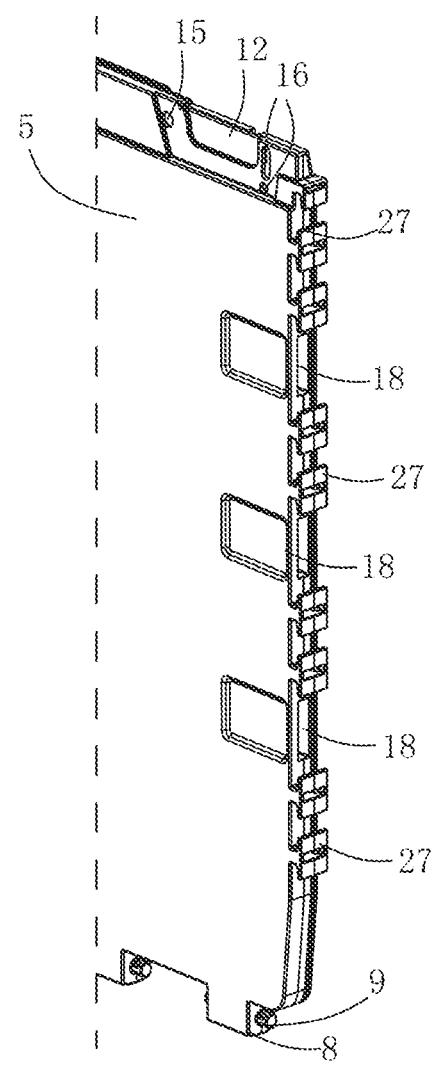
FIG. 5 is a perspective view of a portion of a side plate.
Figure 11:
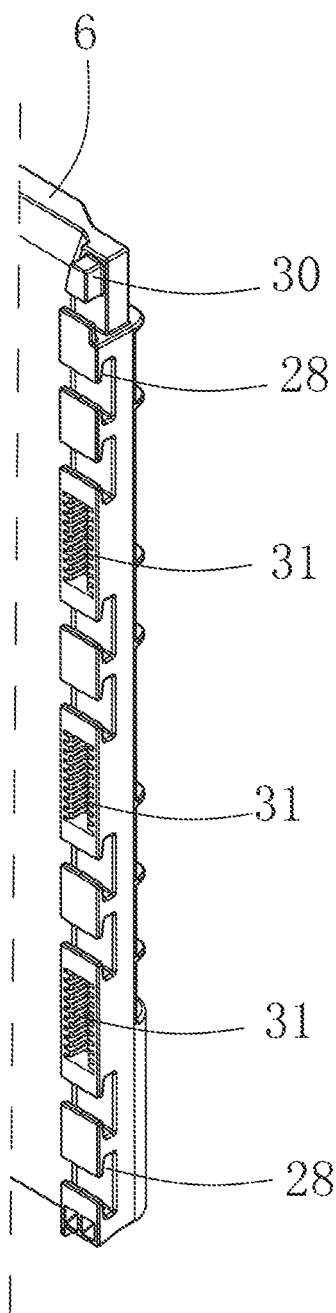
FIG. 11 is a perspective view of a portion of another side plate.
Figure 12:
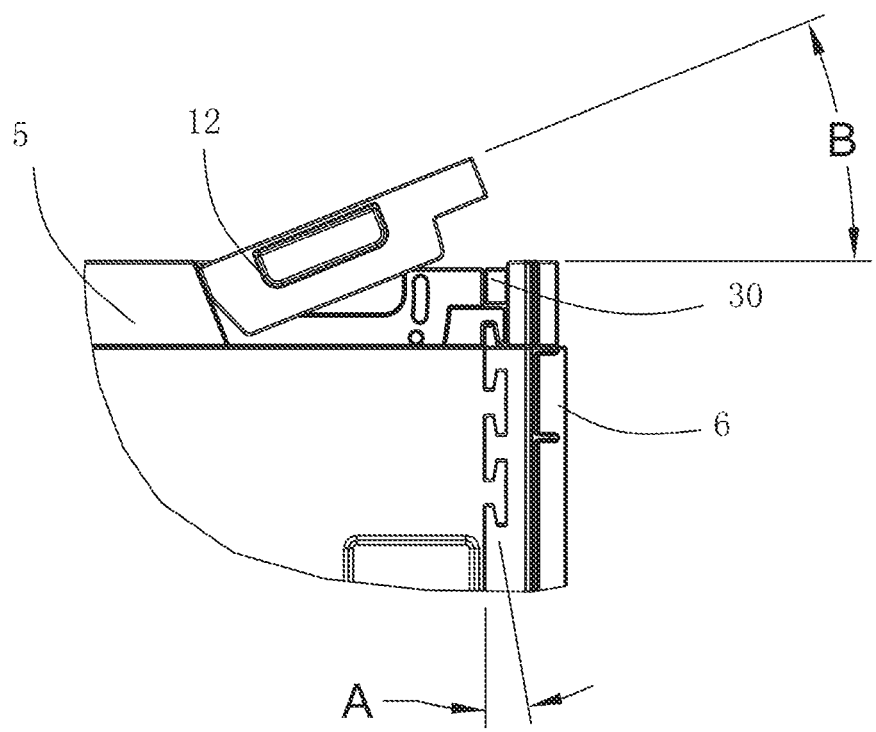
FIG. 12 is a perspective view of a part of the top portions of two side plates engaged mutually with the handle in the open position.
Figure 13:
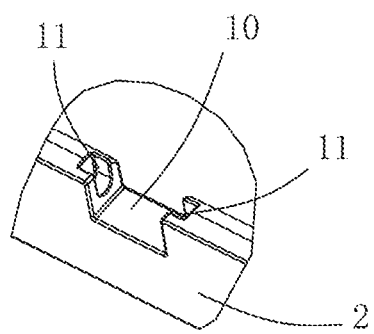
FIG. 13 is a structure diagram of a hinge portion on the base.

As shown in FIGS. 4-5, the side plate 5 is provided with a plurality of extending parts 8 extending downwards from the bottom thereof. The left and right sides of the extending parts 8 are provided with hinge pins 9 respectively. The base 2 is provided with an opening part 10 corresponding to the extending parts 8 of the corresponding side plate; as shown in FIG. 13. The opening part 10 is opened upwards. Two sides of the opening part 10 are provided with hinge grooves 11 respectively. The hinge grooves 11 are opened upwards. Therefore, after being disengaged from the adjacent side plate, the side plate 5 can be removed from the base. The hinge pin 9 cooperates with the hinge groove 11, so that the side plates 5 can be rotated towards the inner side of the container body or towards the outer side of the container body. In this embodiment, the connection structure between the side plate 5 and the base 2 is the same as the connection structure between the side plate 5 and the base 2. The connection structure between the side plates 3, 5 and the base (i.e., the hinge structure) can also adopt other suitable structures, as long as after being disengaged from the adjacent side plates, they can be removed from the base. The connection structure between the side plates 4, 6 and the base can adopt any suitable hinge structure. Preferably, the connection structures between the side plates 4, 6 and the base can be configured such that after the side plate is unlocked from the adjacent side plate, it remains connected to the base, that is, it cannot be removed from the base. Preferably, the connection structure between the side plates 4, 6 and the base is configured such that after the side plates is unlocked from the adjacent side plate, the side plates 4 and 6 can only be folded towards to inner side of the container body with respect to the base, that is, they cannot be folded towards the outer side of the container body. The locking mechanism includes a handle 12 provided on the top of one side plate, a linkage rod 13, a tongue 14, and a locking hole 31 provided in an adjacent side plate (as shown in FIG. 11). The handle 12 is connected with the linkage rod 13. The linkage rod 13 is mounted in the side plate 5 and is associated with the tongue 14 to drive the tongue to move, so that the tongue 14 enters or exits the locking hole 31 to achieve locking or unlocking of adjacent side plates.

Figure 6:
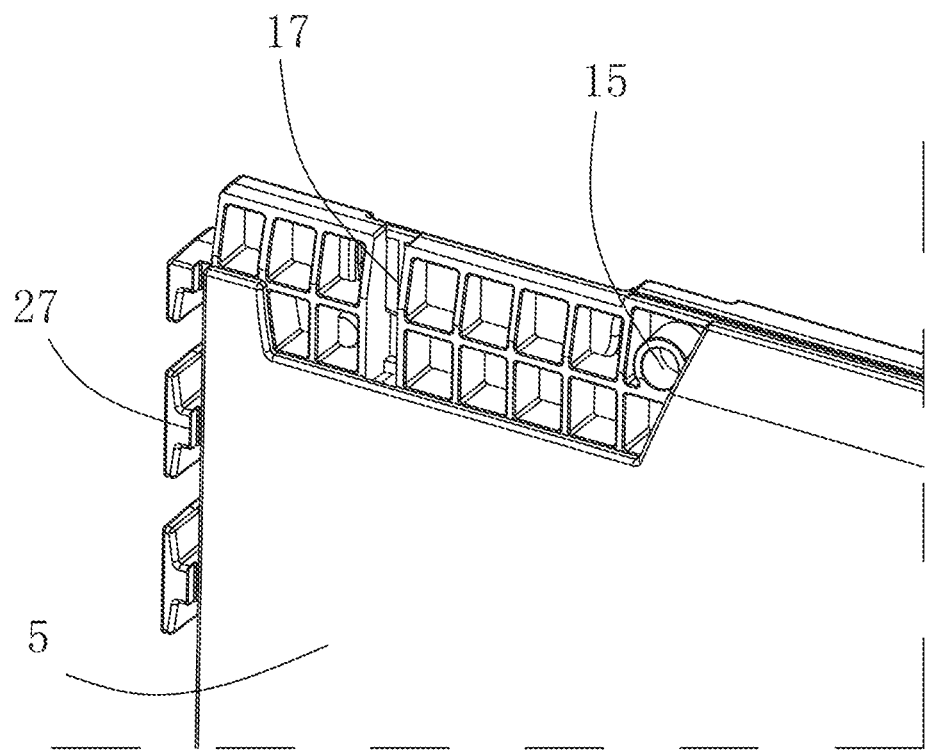
FIG. 6 is a perspective view of a portion of a side plate.

As shown in FIGS. 5 and 6, the top of the side plate 5, i.e., the area where the handle is mounted, is provided with a handle mounting hole 15 and a handle positioning groove 16. The side plate is also provided with a linkage groove 17 and no less than two tongue grooves 18 (three in this embodiment) therein.

Figure 7:
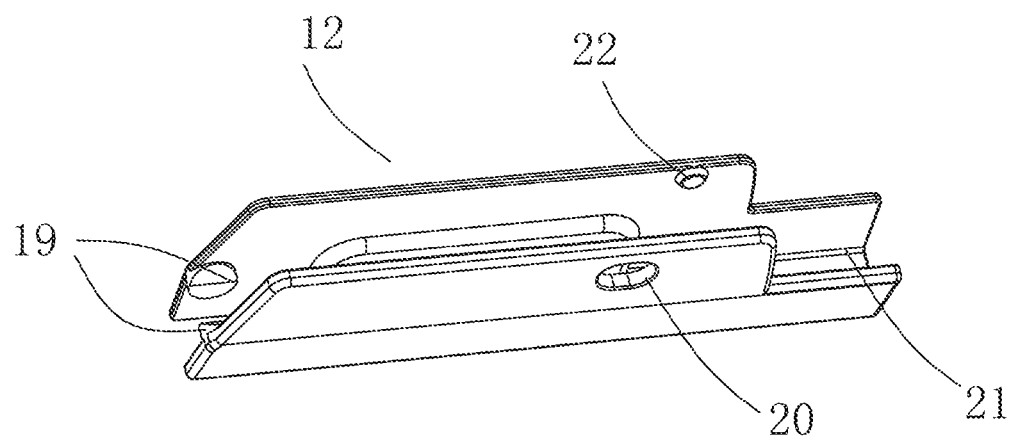
FIG. 7 is a perspective view of a handle.
Figure 8:
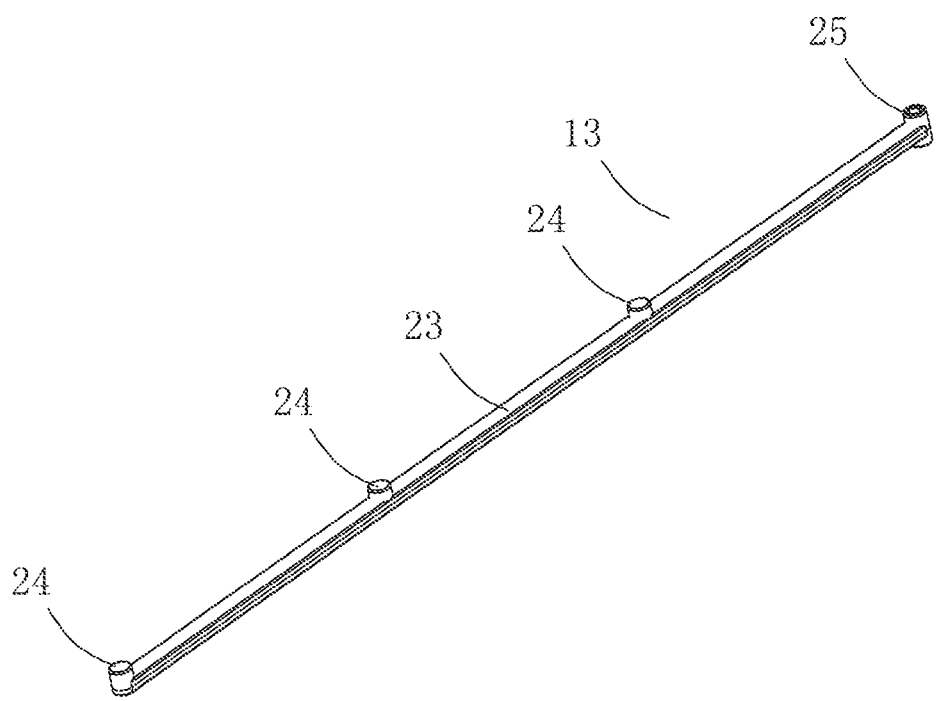
FIG. 8 is a perspective view of a linkage rod.

As shown in FIG. 7, the handle 12 is a member having a substantially U-shaped cross section. A rotating shaft 19 and a driving hole 20 are provided on the inner side of the handle 12. The rotating shaft 19 is located at one end of the handle and is rotatably mounted in the handle mounting hole 15 in the side plate. The driving hole 20 is separated from the rotating shaft 19 by a predetermined distance. The driving hole 20 is an elongate hole. The hanging pin 25 of the linkage rod is installed in the driving hole 20. A hanging groove 21 is also provided at the other end of the handle 12. The hanging groove 21 is cooperated with the hanging table 30 (as shown in FIG. 11) on the top of the adjacent side plate, so that when the locking mechanism is in the locked state, the inner and outer walls of the hanging groove in the handle are fitted over the hanging table, so that the handle also has the ability to restrict the side plate from being rotated inwardly or outwardly relative to the container body.

The inner side of the handle 12 is provided with a positioning projection 22. The positioning protrusion 22 can cooperate with the handle positioning groove 16 to keep the handle 12 at a specified angle.

Figure 9:
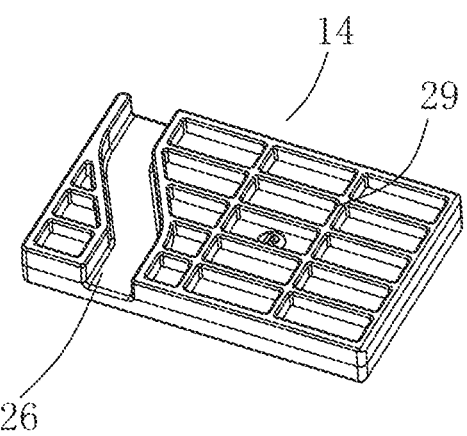
FIG. 9 is a perspective view of a tongue.
Figure 10:
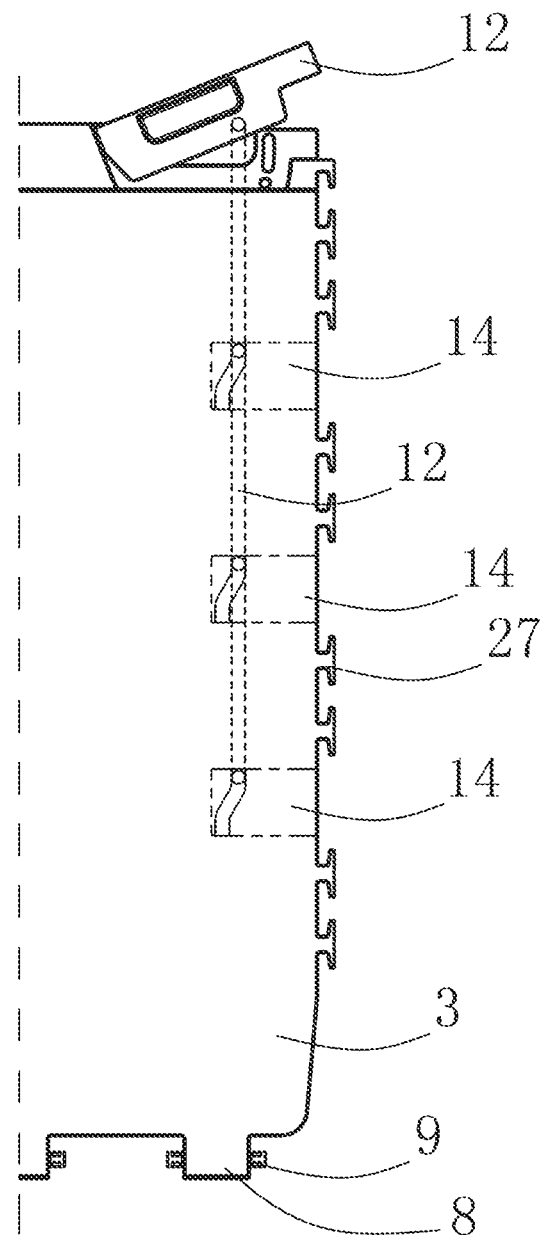
FIG. 10 is a perspective view of a portion of the side plate with the handle in the open position.

The linkage rod 13 has a rod-shaped body 23. The rod-shaped body 23 is distributed with a plurality of spaced driving pins 24 protruding from the rod-shaped main body 23. The head end of the rod-shaped body is also provided with a hanging pin 25. The hanging pin 25 is hung in the driving hole 20 of the handle 12, so that the movement of the handle 12 can drive the linkage rod 13 to move. Each driving pin 24 is engaged with a corresponding tongue 14 to drive the tongue to move. As shown in FIG. 9, the tongue 14 has a plate body 29. The plate body 29 is provided with a driving groove 26. The driving pin 24 is disposed in the driving groove 26. The driving groove 26 is shaped such that when the linkage rod 13 is moving up and down, the driving pin 24 cooperates with the driving groove 26 to drive the tongue 14 to move telescopically such that a tongue protrusion can enter or exit the locking hole in the adjacent side plate to restrict the side plate from moving inwardly or outwardly relative to the adjacent side plate or release it.

The engaging structure includes a first engaging structure 27 provided on one side plate and a second engaging structure 28 provided on an adjacent side plate. The first engaging structure 27 and the second engaging structure 28 are arranged to be able to engage with each other, so that two adjacent side plates are connected together. After being unlocked, the first engaging structure 27 can move inwardly to be disengaged from the second engaging structure 28, and it can also move outwardly to be disengaged from the second engaging structure 28. Thereby, the side plate can be rotated towards inner side of the container body relative to the base, and the side plate can also be towards outer side of the container body relative to the base.

The above-mentioned first engaging structure and second engaging structure are both in the form of running though inside to outside. This is different from a conventional form having a reinforcing baffle on one side (inner side or outer side), such engaging form allows the short side plates to be rotated both inwardly and outwardly relative to the long side plates. The engaging structure is T-shaped or dovetail-shaped, and the included angle A between an engaging surface and the vertical direction is preferably not more than 15 degrees. The engaging structures cooperate with each other to limit the relative movement towards left or right between the side plates.

When it is necessary to unlock the locking mechanism, the handle is rotated upwardly by an angle B, so that the linkage rod is lifted upwards and drives the tongue to move to the left, and then the tongue protrusion is disengaged from the locking groove in the long side plate, so that the short side plate can be rotated inwardly or outwardly relative to the long side plate. Preferably, the angle B is not more than 30 degrees.

At least one side plate of the foldable container of the present application, preferably a pair of opposite side plates, can be rotated both towards inner side of the container body and outer side of the container body by around 90 degrees, thereby facilitating folding and accessing goods inside the box, especially heavy goods. In particular, it can be disassembled after being rotated, thereby providing a large passage, which greatly facilitates the loading and unloading of large and heavy goods.

The preferred embodiments of the present invention have been described in detail above, but it should be understood that, if necessary, aspects of the embodiments can be modified to adopt aspects, features, and concepts of various patents, applications, and publications to provide additional embodiments.

Considering the detailed description above, these and other variations can be made to the embodiments. Generally, in the claims, the terms used should not be construed as limiting the specific embodiments disclosed in the specification and claims, but should be construed to include all possible embodiments together with all equivalents to which these claims entitled.

The invention claimed is:

1. A foldable container, comprising:
a base; and
two pairs of opposite side plates hinged to the base,
wherein adjacent side plates are capable of engaging with each other through engaging structures and being locked with each other through locking mechanisms to form a container body, wherein at least one side plate is configured such that after being unlocked from adjacent side plate, the at least one side plate is rotatable towards an inner side of the container body, and is also rotatable towards an outer side of the container body relative to the base, and
wherein the locking mechanisms comprise of a handle provided on a top of one side plate, a linkage rod, a tongue, and a locking hole provided at an adjacent side plate, wherein the handle is connected to the linkage rod, and the linkage rod is associated with the tongue to drive the tongue to move, so that the tongue enters or exits the locking hole.

2. The foldable container according to claim 1, wherein the engaging structures comprise a first engaging structure provided on one side plate and a second engaging structure provided on adjacent side plate, wherein the first engaging structure and the second engaging structure are configured to be engaged with each other, and the first engaging structure is movable towards the inner side of the container body to be disengaged from the second engaging structure and is also movable towards the outer side of the container body to be disengaged from the second engaging structure.

3. The foldable container according to claim 1, wherein at least one side plate is provided with a hinging pin at the bottom thereof, and an edge of the base is provided with a hinging part, wherein the hinging pin is disposed in and is rotatable relative to the hinging part, and the hinging part is configured such that after the side plate provided with the hinging pin is disengaged from adjacent side plates, the side plate provided with the hinging pin is removable from the base.

4. The foldable container according to claim 3, wherein the hinging part comprises an opening part which opens upwards and hinging grooves provided at both sides of the opening part respectively.

5. The foldable container according to claim 1, wherein a pair of opposite side plates of the two pairs of opposite side plates are configured such that after being unlocked from the adjacent side plates, they are only rotatable towards the inner side of the container body relative to the base.

6. The foldable container according to claim 1, wherein a pair of opposite side plates of the two pairs of opposite side plates are configured such that after being unlocked from adjacent side plates, they are rotatable towards the inner side of the container body relative to the base, and are also rotatable towards the outer side of the container body relative to the base, and the other pair of opposite side plates are configured such that after being unlocked from adjacent side plates, they are only rotatable towards the inner side of the container body relative to the base.

7. The foldable container according to claim 1, wherein at least one of the two pairs of opposite side plates is configured to be detachable from the base after being unlocked from adjacent side plate, and the rest side plates of the two pairs of opposite side plates are configured to remain being connected to the base after being unlocked from the adjacent side plates.

8. The foldable container according to claim 1, wherein the locking mechanism has a plurality of the tongues installed in the side plate at intervals, and the linkage rod is provided with a plurality of driving pins spaced apart, wherein each of the driving pins cooperates with a corresponding tongue to drive the tongue to move.

9. The foldable container according to claim 8, wherein the tongue is provided with a driving groove, the driving pin is placed in the driving groove, and the driving groove is shaped such that when the linkage rod moves up and down, the driving pin cooperates with the driving groove to drive the tongue to move telescopically.

10. The foldable container according to claim 1, wherein the handle is provided with a rotating shaft and a driving hole, the side plate is provided with a handle mounting hole, and the linkage rod is provided with a hanging pin, wherein the rotating shaft is rotatably installed in the handle installation hole, and the hanging pin is movably connected to the driving hole.

11. The foldable container according to claim 1, wherein the handle is further provided with a positioning protrusion, the side plate is provided with a handle positioning groove, and the positioning protrusion cooperates with the handle positioning groove, so that the handle is maintained at a specified angle.

12. The foldable container according to claim 1, wherein the handle is further provided with a hanging groove, and a hanging table is provided on the side plate adjacent to the side plate provided with the handle, wherein the hanging groove and the hanging table cooperates with each other, so that when the locking mechanism is in a locked state, the inner and outer walls of the hanging groove on the handle are fitted over the hanging table.

13. A foldable container, comprising a base and two pairs of opposite side plates hinged to the base, wherein adjacent side plates are capable of engaging with each other through engaging structures and being locked with each other through locking mechanisms to form a container body, wherein
the engaging structures comprises a first engaging structure provided on one side plate and a second engaging structure provided on adjacent side plate, the first engaging structure and the second engaging structure are configured to be capable of engaging with each other, and the first engaging structure is movable towards an inner side of the container body to be disengaged from the second engaging structure and is also movable towards an outer side of the container body to be disengaged from the second engaging structure;
at least one side plate is provided with a hinging pin at the bottom thereof, and an edge of the base is provided with a hinging part, wherein the hinging pin is disposed in and is rotatable relative to the hinging part, and the hinging part is configured such that after the side plate provided with a hinging pin is disengaged from adjacent side plate, the side plate provided with the hinging pin is removable from the base; and
the locking mechanisms comprise of a handle provided on the top of one side plate, a linkage rod, a tongue, and a locking hole provided in an adjacent side plate, wherein the handle is connected to the linkage rod, and the linkage rod is associated with the tongue to drive the tongue to move, so that the tongue enters or exits the locking hole.

14. The foldable container according to claim 13, wherein the locking mechanism has a plurality of the tongues installed in the side plate at intervals, and the linkage rod is provided with a plurality of driving pins spaced apart, each of the driving pins cooperates with a corresponding tongue to drive the tongue to move.

15. The foldable container according to claim 14, wherein the tongue is provided with a driving groove, the driving pin is placed in the driving groove, and the driving groove is shaped such that when the linkage rod moves up and down, the driving pin cooperates with the driving groove to drive the tongue to move telescopically.

16. The foldable container according to claim 13, wherein the handle is provided with a rotating shaft and a driving hole, the side plate is provided with a handle mounting hole, and the linkage rod is provided with a hanging pin, wherein the rotating shaft is rotatably installed in the handle installation hole, and the hanging pin is movably connected to the driving hole.

17. The foldable container according to claim 13, wherein the handle is further provided with a hanging groove, and a hanging table is provided on the side plate adjacent to the side plate provided with the handle, wherein the hanging groove and the hanging table cooperates with each other, so that when the locking mechanism is in a locked state, the inner and outer walls of the hanging groove on the handle are fitted over the hanging table.

* * * * *